(12) United States Patent
Cheng

(10) Patent No.: US 6,938,661 B2
(45) Date of Patent: Sep. 6, 2005

(54) LAMINATING MACHINE

(75) Inventor: James Cheng, Chia Yi Hsien (TW)

(73) Assignee: Homedal Industrial Corporation (TW)

( * ) Notice: Subject to any disclaimer, the term of this patent is extended or adjusted under 35 U.S.C. 154(b) by 167 days.

(21) Appl. No.: 10/617,725

(22) Filed: Jul. 14, 2003

(65) Prior Publication Data

US 2004/0250958 A1 Dec. 16, 2004

(51) Int. Cl.[7] ............................................. B32B 31/04

(52) U.S. Cl. ....................... 156/555; 156/556; 156/580; 156/583.1

(58) Field of Search .............................. 156/555, 272.2, 156/381, 552, 556, 580, 582, 583.1; 100/327, 155 R, 160, 176

(56) References Cited

U.S. PATENT DOCUMENTS

| | | | | |
|---|---|---|---|---|
| 4,259,143 A | * | 3/1981 | Giulie et al. | 156/499 |
| 4,451,320 A | * | 5/1984 | Marvel | 156/366 |

* cited by examiner

*Primary Examiner*—Chris Fiorilla
*Assistant Examiner*—Michelle Acevedo Lazor
(74) *Attorney, Agent, or Firm*—Stites & Harbison PLLC; Douglas E. Jackson

(57) ABSTRACT

A laminating machine includes two side frames and two rolls rotatably mounted between the side frames. One of the rolls has a first gear securely mounted thereon, and the other roll has a second gear securely mounted thereon. A movable plate is pivoted to one of the side frames. A unidirectional motor is mounted to a side of the movable plate and has an output shaft on which a clutch gear is securely mounted. The clutch gear is optionally meshed with one of the first gear and the second gear upon pivotal movement of the movable plate between a first position and a second position, allowing the object to be laminated to be moved forward or rearward depending on the need of the user.

4 Claims, 6 Drawing Sheets

LAMINATING MACHINE

BACKGROUND OF THE INVENTION

1. Field of the Invention

The present invention relates to a laminating machine. In particular, the present invention relates to a laminating machine that heats a pair of plastic sheets for covering an object such as a photograph, a card, or a document to be preserved for a longer period of time.

2. Description of the Related Art

FIGS. 5 through 8 illustrate a conventional laminating machine comprising two side frame 13', a pivotal frame 11' pivotally mounted to one of the main frames 13', and a clutch gear 12' mounted on an output shaft 161' of a motor 16' that is mounted on the pivotal frame 11'. Upon pivotal movement of the pivotal frame 11', the clutch gear 12' meshes with the transmission gears 15', and the power transmission from the motor 16' to the feeding rolls 17' is allowed. On the other hand, the clutch gear 12' can be disengaged from the transmission gears 15' and thus stop the power transmission from the motor 16' to the feeding rolls 17'. Thus, the feeding rolls 17' are not driven by the motor 16' in this clutch-off state. This allows the user to withdraw the object to be laminated when the laminating procedure is hindered or interrupted. Although pivotal movement of the pivotal frame 11' causes the clutch gear 12' to disengage from the transmission gears 15' and thus successfully cut off the power transmission from the motor 16' to the feeding rolls 17', the object to be laminated is still tightly clamped between the feeding rolls 17' even if the laminating procedure is hindered or interrupted. The object would deform or even be damaged when the user applies a force to pull the objected out of the feeding rolls 17'.

SUMMARY OF THE INVENTION

An object of the present invention is to provide a laminating machine that allows the object to be laminated to move forward or rearward depending on the need of the user.

A laminating machine in accordance with the present invention comprises:

two side frames;

a first roll rotatably mounted between the side frames, the first roll including an axle that has an end extending beyond one of the side frames, a first gear being securely mounted to the end of the axle of the first roll;

a second roll rotatably mounted between the side frames, the second roll including an axle that has an end extending beyond said one of the side frames, a second gear being securely mounted to the end of the axle of the second roll and meshing with the first gear;

a heating device enclosing the first roll and the second roll, leaving an inlet through which an objected to be laminated enters the heating device and an outlet through which the object laminated by the heating device leaves the heating device;

said one of the side frames including a lug and a positioning member, a movable plate being pivotally mounted by a pivotal shaft to the lug and including a guide slot, the positioning member being slidably received and guided in the guide slot;

a unidirectional motor being mounted to a side of the movable plate and including an output shaft, a clutch gear being securely mounted to the output shaft to turn therewith, the output shaft of the motor being extending through the movable plate, allowing joint movement of the movable plate and the output shaft of the motor, the clutch gear being optionally meshed with one of the first gear and the second gear upon pivotal movement of the movable plate between a first position and a second position, wherein when the movable plate is in the first position, the clutch gear meshes with the first gear such that power outputted by the motor is transmitted to the first gear and then the second gear meshed with the first gear, which causes the first roll and the second roll to move the object forward, and wherein when the movable plate is in the second position, the clutch gear meshes with the second gear such that the power outputted by the motor is transmitted to the second gear and then the first gear meshed with the second gear, which causes the first roll and the second roll to move the object rearward.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
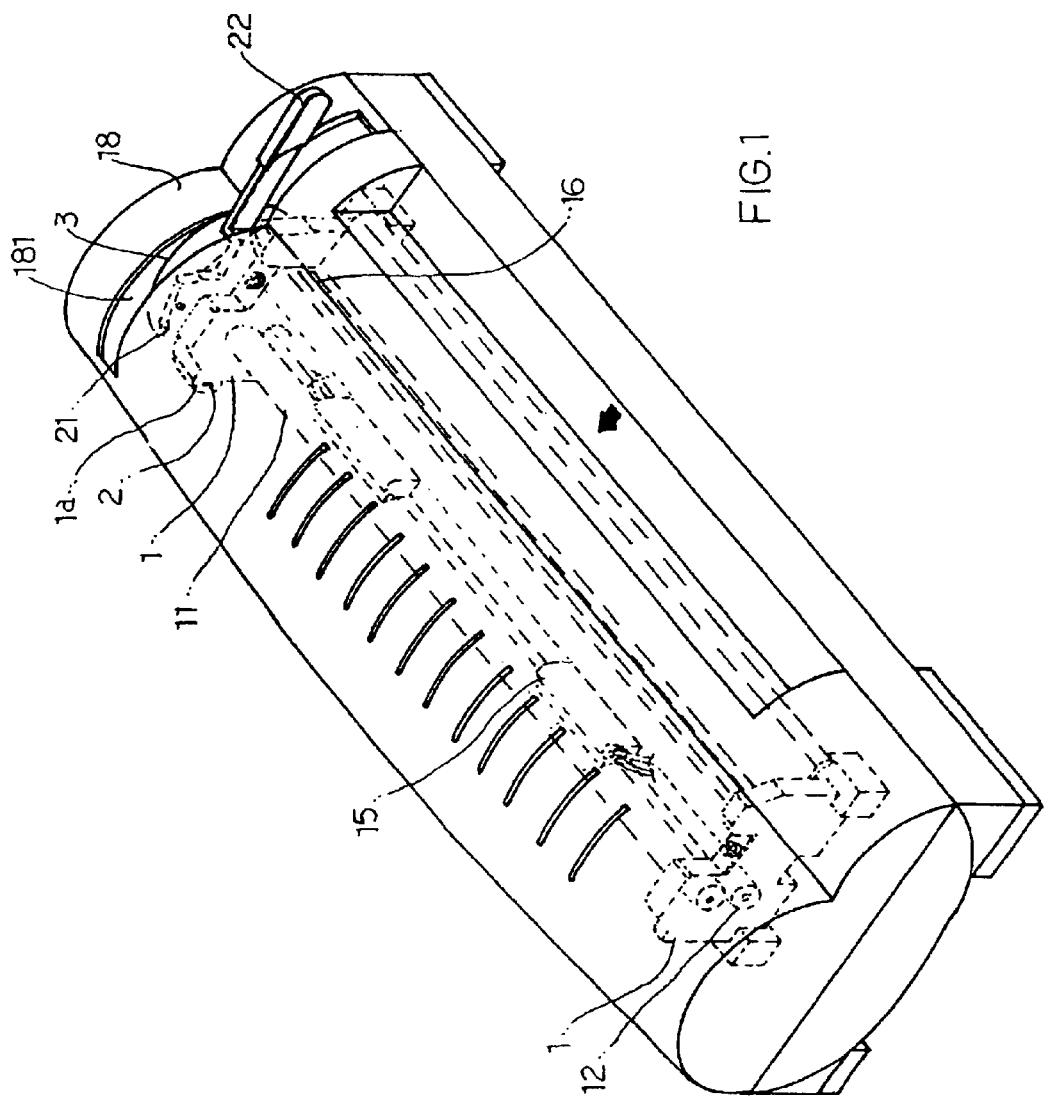
FIG. 1 is a perspective view of a laminating machine in accordance with the present invention.
Figure 2:
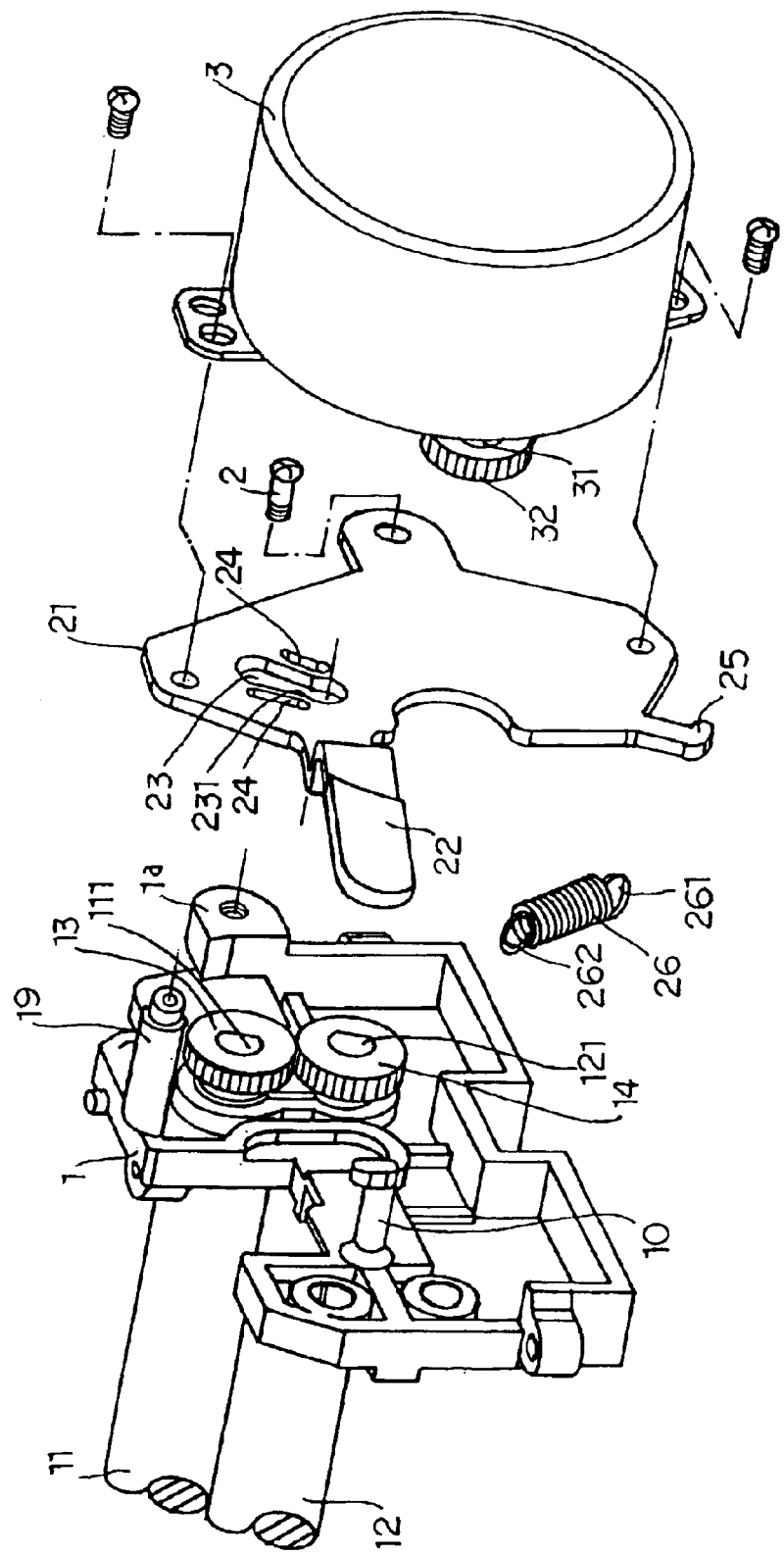
FIG. 2 is a perspective view, partly cutaway, of a main portion of the laminating machine in accordance with the present invention.
Figure 3:
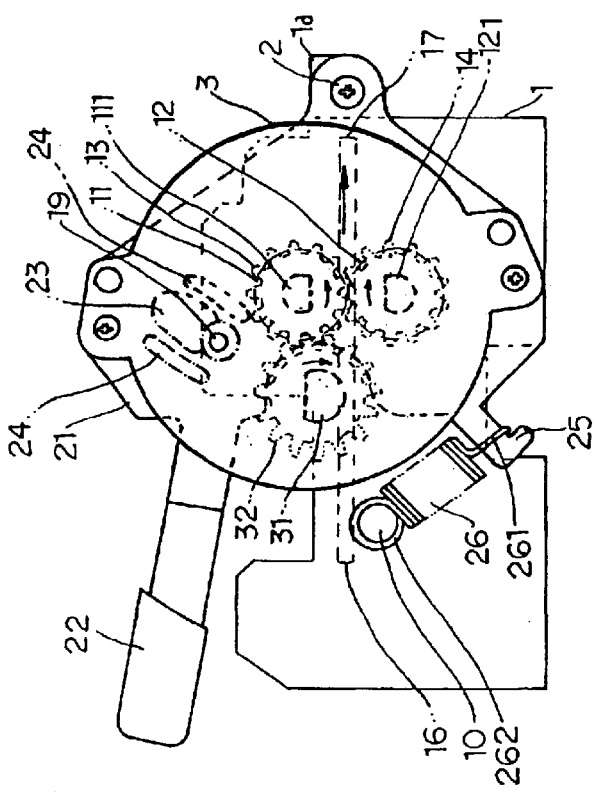
FIG. 3 is a side view of the laminating machine in accordance with the present invention, wherein an object to be laminated is moved forward.
Figure 5:
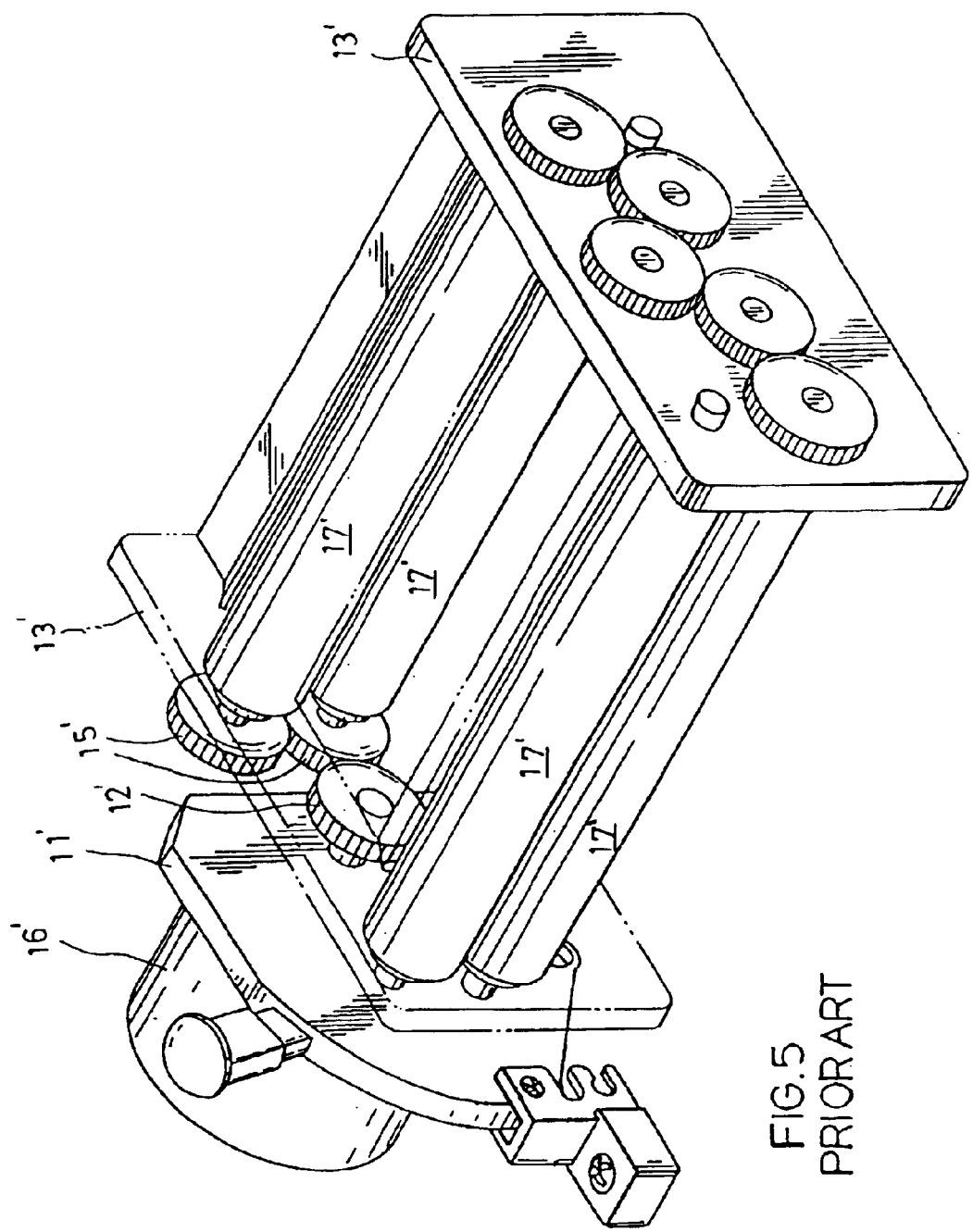
FIG. 5 is a perspective view of a conventional laminating machine.
Figure 6:
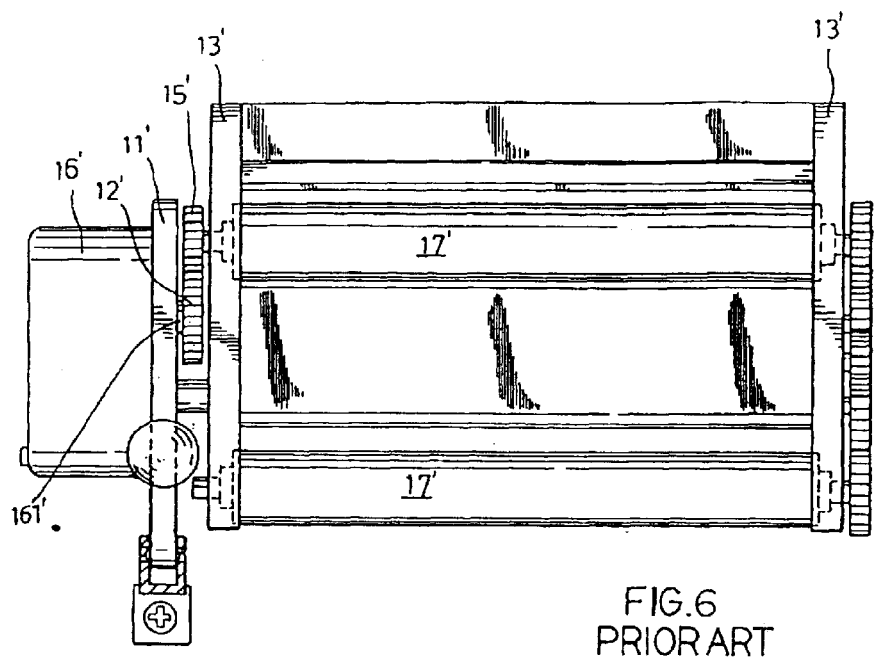
FIG. 6 is a top view of the conventional laminating machine, wherein a clutch gear is in an engaged position.
Figure 7:
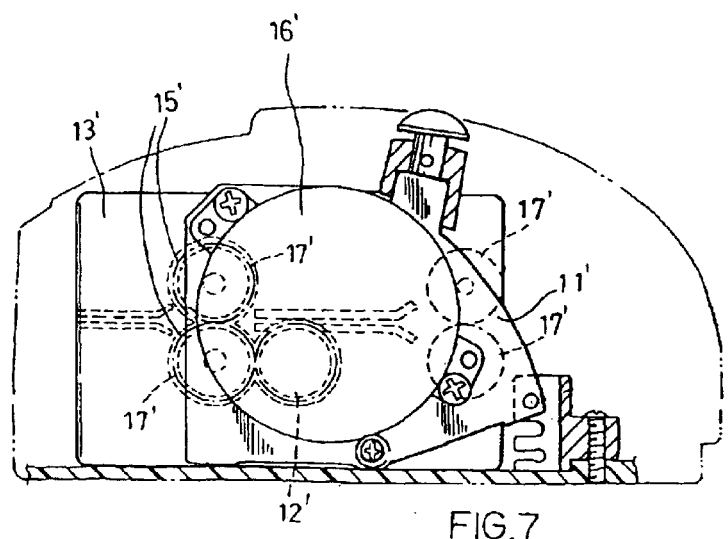
FIG. 7 is a schematic sectional view of the conventional laminating machine in FIG. 6.
Figure 8:
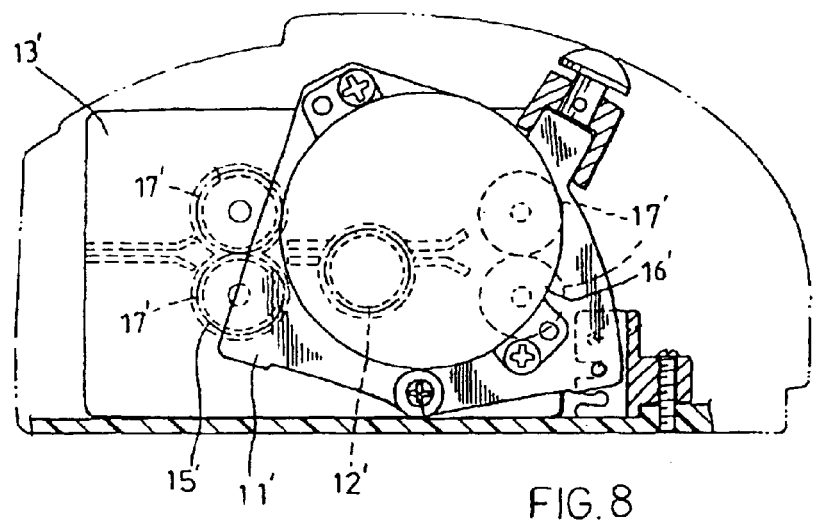
FIG. 8 is a view similar to FIG. 7, illustrating operation of the conventional laminating machine.
Figure 9:
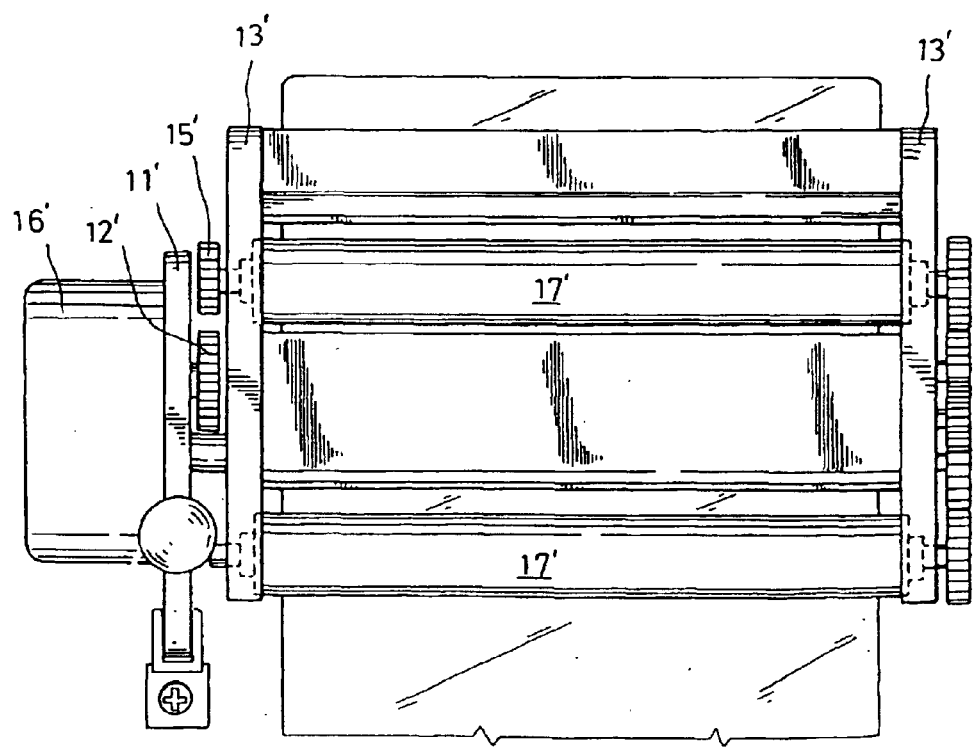
FIG. 9 is a view similar to FIG. 6, wherein the clutch gear is in a disengaged position.

Referring to FIGS. 1 through 3, a laminating machine in accordance with the present invention generally comprises a pair of side frames 1, a first roll 11, and a second roll 12. An end of an axle 111 of the first roll 11 extends through an associated side frame 1 and has a first gear 13 securely mounted thereon. An end of an axle 121 of the second roll 12 extends through an associated side frame 1 and has a second gear 14 securely mounted thereon. The first gear 13 and the second gear 14 mesh with each other. The first roll 11 and the second roll 12 are completely enclosed by a heating device 15, leaving an inlet 16 in a front end of the heating device 15 and an outlet 17 in a rear end of the heating device 15.

An object to be laminated (such as a photograph, a card, or a document to be preserved for a longer period of time) enters the heating device 15 via the inlet 16 and heated by the first and second rolls 11 and 12, which, in turn, are heated by the heating device 15. Two plastic sheets (not shown) are thus bonded together, and the laminated object leaves the heating device 15 via the outlet 17.

At least one of the side frames 1 includes a lug 1a formed thereon, and a movable plate 21 is pivoted by a pivotal shaft 2 to the lug 1a. Mounted to a side of the movable plate 21 is a unidirectional motor 3 having an output shaft 31 that always turns, e.g., clockwise. The output shaft 31 is securely extended through the movable plate 21 to move therewith, and a clutch gear 32 is securely mounted on the output shaft 31 to turn therewith. The clutch gear 32 meshes with the first gear 13 or the second gear 14, depending on the position of the pivotally movable plate 21. When the clutch gear 32 meshes with the first gear 13, the power outputted by the motor 3 is transmitted to the first gear 13 and thus causes counterclockwise rotation of the first gear 13. The second gear 14 meshed with the first gear 13 turns clockwise, driving the first and second rolls 11 and 12, which, in turn, move the object to be laminated forward, as shown in FIG. 3.

Figure 4:
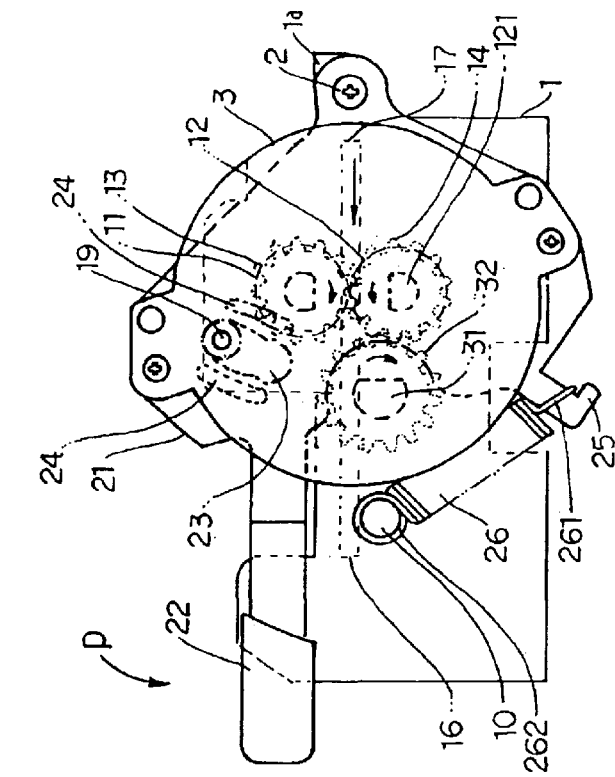
FIG. 4 is a view similar to FIG. 3, illustrating rearward movement of the object.

When the clutch gear 32 meshes with the second gear 14, the power outputted by the motor 3 is transmitted to the second gear 14, causing counterclockwise rotation of the second gear 14 and clockwise rotation of the first gear 13 that meshes with the second gear 14. Thus, the first gear 13 drives the first and second rolls 11 and 12 to move the object to be laminated rearward, as shown in FIG. 4.

To provide convenient pivotal movement of the movable plate 21, a grip 22 extends from the movable plate 21 and through a slot 181 of a casing 18 of the laminating machine. Thus, the user may manually grasp the grip 22 and pivotally move the movable plate 21 between a first position in which the clutch gear 32 meshes with, e.g., the first gear 13 and a second position in which the clutch gear 32 meshes with, e.g., the second gear 14. Further, to guide the movable plate 21 along a predetermined pivotal trace for subsequent easy engagement with the first gear 13 or the second gear 14, a guide groove 23 is defined in the movable slot 21, and the side frame 1 has a positioning member 19 that is slidably received and guided in the guide groove 23 of the movable slot 21. Further, to provide a reliable meshing between the clutch gear 32 and the first gear 13, a necked portion 231 is formed in the guide groove 23 and has a width slightly smaller than a diameter of the positioning member 19. Thus, the necked portion 231 can be securely engaged with an upper side of the positioning member 19, thereby retaining the movable plate 21 in place. Further, before the grip 22 is subject to an external force P and thus pressed, in order to reliably retain the necked portion 231 on the upper side of the positioning member 19, the movable plate 21 includes a hook 25 to which an end 261 of a return spring 26 is attached, while the other end 262 of the return spring 26 is attached to a peg 10 on an outer side of an associated side frame 1. Thus, the return spring 26 always exerts a force to the movable plate 21. Two slots 24 may be defined in both sides of the guide groove 23, allowing the necked portion 231 to slightly expand outward when the positioning member 19 is sliding through the necked portion 231.

In particular, during normal operation of the laminating machine, the output shaft 31 of the motor 3 always turns, e.g., clockwise, the clutch gear 32 on the output shaft 31 of the motor 3 meshes with the first gear 13 which is thus driven counterclockwise, and the second gear 14 meshed with the first gear 13 turns clockwise. The first and second rolls 11 and 12 together feed the object forward for laminating operation. In a case that the laminating operation is hindered or interrupted, the user may apply a force P to the grip 22 to pivot the movable plate 21 about the pivotal shaft 2. The positioning member 19 is moved from the lower end of the guide slot 23 to the upper end of the guide slot 23 and retained there, as shown in FIG. 4. The clutch gear 32 is thus meshed with the second gear 14, with the second gear 14 turning counterclockwise, and with the first gear 13 turning clockwise. The first and second rolls 11 and 12 are thus driven to move the object rearward. As a result, the user needs not to directly pull the object.

Further, the object can only be laminated at the front or rear end edge, as the object to be laminated can be optionally moved forward and rearward.

Although the invention has been explained in relation to its preferred embodiment, it is to be understood that many other possible modifications and variations can be made without departing from the scope of the invention as hereinafter claimed.

What is claimed is:

1. A laminating machine comprising:

two side frames, a first roll rotatably mounted between the side frames, the first roll including an axle that has an end extending beyond one of the side frames, a first gear being securely mounted to the end of the axle of the first roll;

a second roll rotatably mounted between the side frames, the second roll including an axle that has an end extending beyond said one of the side frames, a second gear being securely mounted to the end of the axle of the second roll and meshing with the first gear;

a heating device enclosing the first roll and the second roll, leaving an inlet through which an objected to be laminated enters the heating device and an outlet through which the object laminated by the heating device leaves the heating device;

said one of the side frames including a lug and a positioning member, a movable plate being pivotally mounted by a pivotal shaft to the lug and including a guide slot, the positioning member being slidably received and guided in the guide slot;

a unidirectional motor being mounted to a side of the movable plate and including an output shaft, a clutch gear being securely mounted to the output shaft to turn therewith, the output shaft of the motor extending through the movable plate, allowing joint movement of the movable plate and the output shaft of the motor, the clutch gear being meshed with either one of the first gear and the second gear upon pivotal movement of the movable plate between a first position and a second position, wherein when the movable plate is in the first position, the clutch gear meshes with the first power outputted by the motor is transmitted to the first gear and then the second gear meshed with the first gear, which causes the first roll and the second roll to move the object forward, and wherein when the movable plate is in the second position, the clutch gear meshes with the second gear such that the power outputted by the motor is transmitted to the second gear and then the first gear meshed with the second gear, which causes the first roll and the second roll to move the object rearward.

2. The laminating machine as claimed in claim 1, wherein the movable plate includes a grip extending beyond a casing of the laminating machine via a slot of the casing.

3. The laminating machine is claimed in claim 1, wherein the guide slot includes a necked portion having width slightly smaller than a diameter of the positioning member, thereby allowing the necked portion to be retained in an upper side of the positioning member.

4. The laminating machine as claimed in claim 1, wherein the movable plate further includes a hook, a peg being formed on said one of the side frames, further including a return spring having a first end attached to the hook and a second end attached to the peg.

* * * * *